Jan. 4, 1927.  1,612,863
T. P. GARANKIN
AUTOMATIC CAR COUPLING
Filed Jan. 20, 1923   3 Sheets-Sheet 1
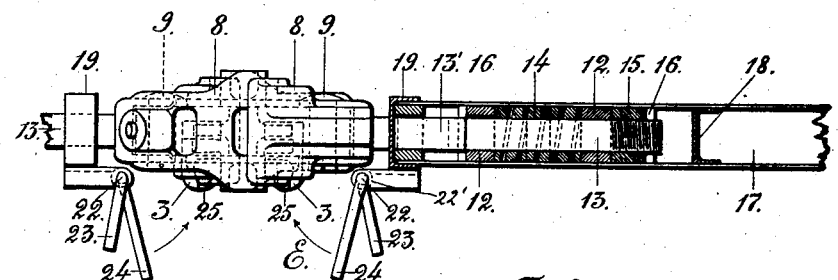
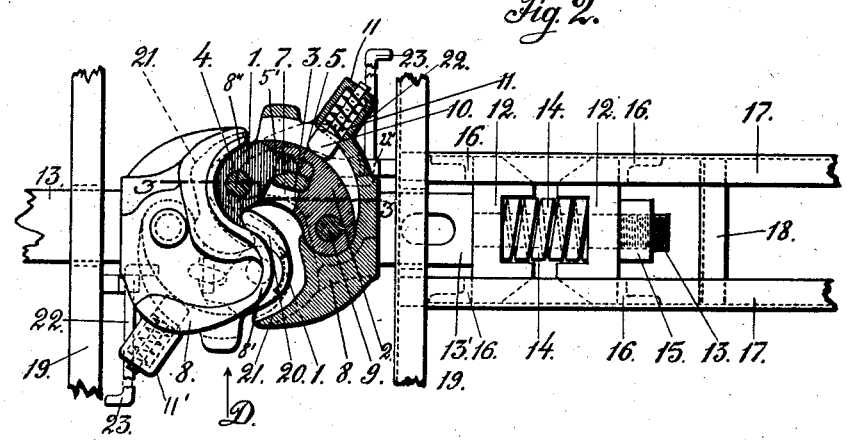
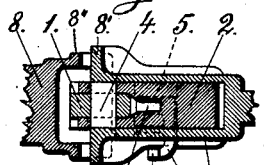
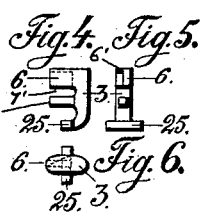
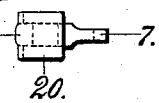
THEODORE P. GARANKIN.
INVENTOR.
BY John P. Nikonow
ATTORNEY.

Jan. 4, 1927.
T. P. GARANKIN
1,612,863
AUTOMATIC CAR COUPLING
Filed Jan. 20, 1923   3 Sheets-Sheet 2
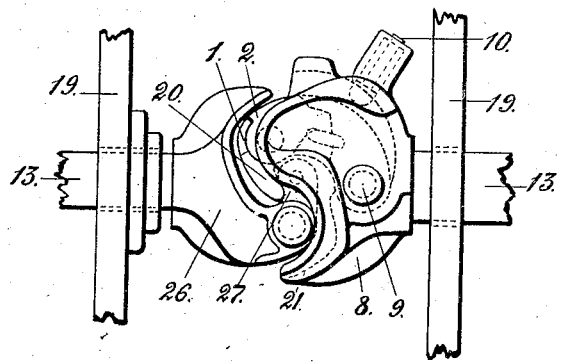
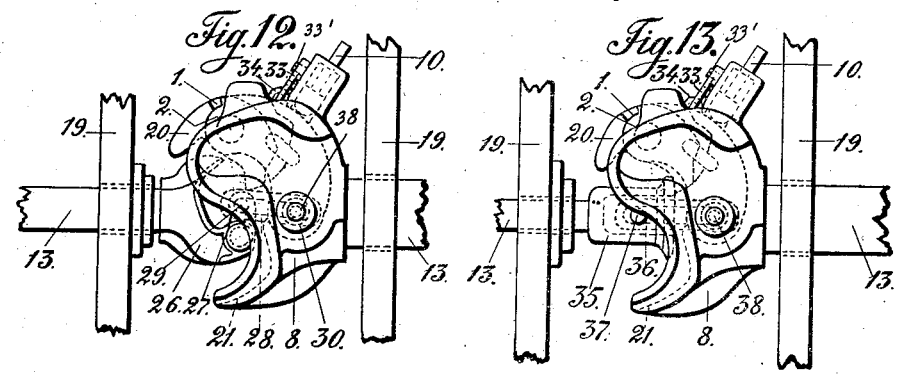
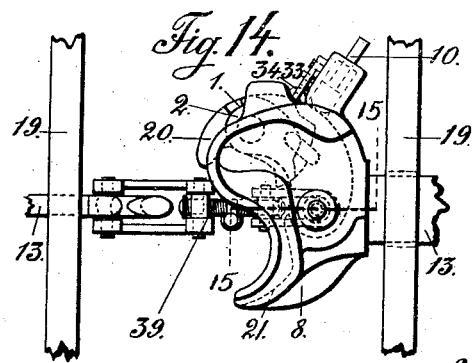 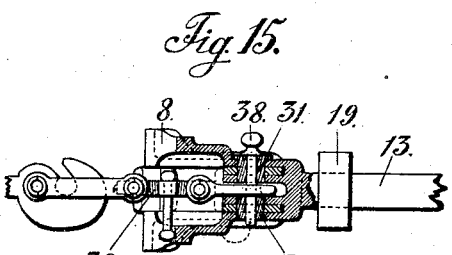
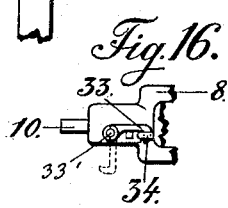
THEODORE P. GARANKIN.
INVENTOR.
BY *John P. Nixonow*
ATTORNEY.

Jan. 4, 1927.
T. P. GARANKIN
AUTOMATIC CAR COUPLING
Filed Jan. 20, 1923
1,612,863
3 Sheets-Sheet 3
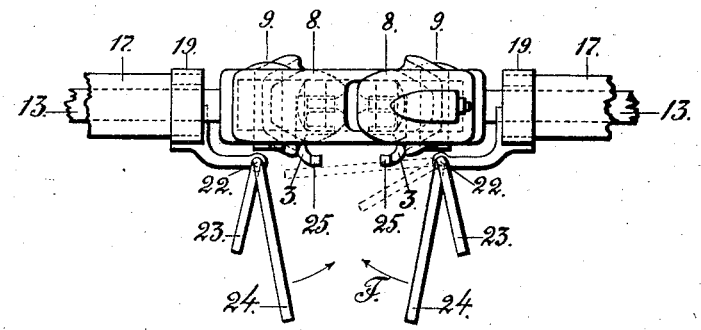
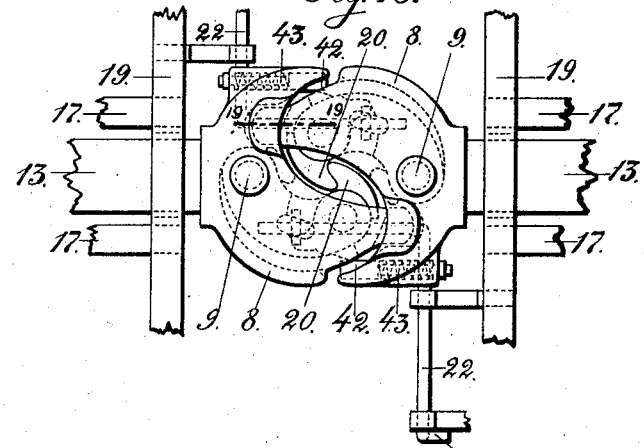
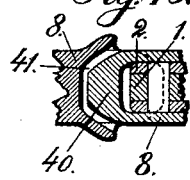
THEODORE P. GARANKIN.
INVENTOR.
BY John P. Nikonow
ATTORNEY.

Patented Jan. 4, 1927.

1,612,863

UNITED STATES PATENT OFFICE.

THEODORE P. GARANKIN, OF NEW YORK, N. Y.

AUTOMATIC CAR COUPLING.

Application filed January 20, 1923. Serial No. 613,946.

My invention relates to car couplings and has a particular reference to the car couplings of a central buffer type, part of the coupling itself being adapted to act as a buffer.

The object of my invention is to provide a car coupling of an automatic type which can couple together the railroad cars by simply bringing them in contact with each other, which can be uncoupled from the outside of the cars, and which can be coupled with any other existing types of couplings for the railroad cars.

My invention is more fully described in the accompanying specification and drawings in which—

Fig. 1 is an elevation partly in section of my coupling in engagement with another coupling, the view being taken in a direction of an arrow "D" of the Fig. 2, Fig. 2 is a plan view of same partly in section, Fig. 3 is a section taken on the line 3—3 of Fig. 2, Fig. 4 is a detailed view of a locking pin, Figs. 5 and 6 are other projections of the same pin, Fig. 7 is a plan view of a knuckle, Fig. 8 is a side view of same, Fig. 9 is a plan view of a knuckle arm, Fig. 10 is a side view of same, Fig. 11 is a view showing my coupling in engagement with an ordinary car coupling, Fig. 12 is a similar view showing my coupling in engagement with another coupling without using a pivoted knuckle, Fig. 13 is a view showing my coupling in engagement with a straight link coupling, Fig. 14 is a plan view showing my coupling in engagement with a link or chain type of a coupling, Fig. 15 is a sectional elevation of same, Fig. 16 is a detailed view of a device adapted to lock the knuckle in an inoperative position, Figs. 17 and 18 are views of a modified coupling, and Fig. 19 is a partial view of same in section.

My coupling consists of a knuckle 1 and a knuckle arm 2, the knuckle being pivotally mounted on a pin 4 in a hollow recess 4' in the front portion of the arm 2. The front portion of the knuckle is shaped in the form of a hook 20, and the rear end is made in the form of a thin lug 7. The rear end of the knuckle arm is pivotally mounted on a pin 9 fastened in the sides of a hollow buffer head 8 attached to the front end of a drawbar 13 and forming a housing for the knuckle 1 and the arm 2. This housing partly encircles the arm 2 so as to limit its outward movement and partly extends over the swinging knuckle 1 where it is provided with buffer flanges 8'. The other side, opposite the arm 2, is provided with a concave recess 21 with buffer flanges 8" adapted to bear against flanges 8' of the other coupling. In this way the buffer head is provided with S-shaped flanges adapted to engage similar flanges of another coupling, the convex portion of one coupling resting against the concave portion of the other.

The knuckle arm 2 is provided with a slot 5 for a sliding locking pin 3. In an operative position the locking pin rests in its lowest position (Fig. 3) so that the lug 6 of the pin engages the lug 7 of the knuckle 1 thereby preventing same from moving outwards. A rib 6' catches the edge of the lug 7 and prevents the pin from falling entirely out of the slot 5. The lug 6" serves to guide the pin in its movement and the enlarged tail end 25 limits the upward movement of the pin which in its upper position releases the knuckle 1, the lug 7 being free to move in a slot 7'.

The arm 2 with the knuckle 1 are kept in an operating position by means of a plunger 10 with a spring 11 placed in a tubular recess 11'.

In order to release the coupling the pin 3 must be raised, and this is accomplished by means of a releasing lever 22 with an operating end 24 and a handle 23 which extends to the side of the car. This releasing arm 22 is rotatively mounted in a bearing 22' mounted on a buffer bar 19. By swinging the lever in a direction of an arrow "E" the end 24 bears against the locking pin 3 (its tail end 25) thereby raising same to its upper position when the knuckle 1 is released from engagement with the lug 6 of the pin 3.

The drawbar 13 has sliding blocks 12 placed between a shoulder 13' and a nut 15 with a heavy spring 14 between. The edges of the blocks 12 rest against angles 16 attached to longitudinal bars 17 forming a frame with cross bars 18 and buffer bar 19.

The operation of this coupling is as follows. The locking pin (or bar) 3 being normally in its lowest position, the knuckle 1 is locked with the arm 2 forming a hook shaped member, being ready to couple with the coupling of another car.

By bringing the cars together the inclined surface of the knuckle head 20 is made to slide over similar surface of the other coupling, thereby forcing the knuckles apart against the tension of the springs 11 until the hooks 20 pass each other, the arms 2 being deflected almost to the limit of their movement. The knuckles, upon passing each other, come together again and engage each other with their inner surfaces. With the further movement of the cars the flanges 8' and 8'' bear against each other and force the drawbars 13 with the blocks 12 to slide against the tension of the springs 14. The same spring transmits the pull on the coupling from one car ahead.

Fig. 11 shows my coupling in an engagement with a standard or ordinary coupling 26 with a knuckle 27. Fig. 12 shows my coupling in an engagement with another coupling without using a pivoted knuckle. In this case a pin 29 is placed in a hole in the knuckle 27, and a link 28 employed to connect this pin with a pin 38 taking place of a pin 9. The pin 38 is smaller in diameter than the pin 9 and is placed between bushings 31 and 32, or a single bushing 30 (see also Fig. 15).

Fig. 13 illustrates a case when my coupling is connected with a hollow buffer head 35 by means of a link 36 and a pin 37.

In both of the above cases the knuckle 1 is made inoperative by locking same in an open position by means of a hook 33 on a pin 33' engaging an eye 34 on the arm 2, (see also Fig. 16).

Figs. 14 and 15 illustrate a case when my coupling is used with a chain or links 39 of another car (Fig. 15 being taken in section on the line 15—15).

Fig. 17 represents a modification in which the sides of the buffer housing or head 8 extend over the knuckles 1 forming a buffer head 40. The housing 8 is provided in this case with a cup-shaped depression 41 adapted to receive the head 40. This arrangement strengthens the housing 8 by bridging over its front portion.

Instead of a plunger 10 I am using plunger 42 in this case with a spring 43, this plunger being adapted to act on the knuckle of the other coupling, so that the plunger does not begin to act on the knuckle until the cars are coupled.

The operating arm of the releasing lever 22 can be made longer so as to act on the locking bar of the other coupling as it is shown in dotted lines in Fig. 17 (the arm moving in a direction of arrows "F"). In this case if the arm 24 should be locked in a releasing position by means of a suitable hook (not shown) supporting it in a horizontal position, then this locking arrangement is automatically released when the cars are moved apart.

Important advantages of my car coupling are that it is automatic in its action, may be released from the side of the car, can be used with any other existing type of a car coupling, is positive in its action, does not require separate buffers, and is simple in construction.

I claim as my invention:

1. In a car coupling, the combination with a hollow housing, the front portion of said housing being of a convex form on one side and of a concave form on the other side, a knuckle arm pivotally mounted inside and back of said convex portion, a knuckle pivotally mounted on said knuckle arm, and means to limit the movements of said knuckle arm in said housing.

2. In a car coupling, the combination with a housing, the front portion of said housing being of a convex form on one side and of a concave form on the other side, a knuckle arm and a knuckle pivotally mounted inside of said housing and back of said convex portion, said convex portion forming a buffer in front of said knuckle arm, and means to guide said buffer when said coupling is in an operating position.

3. In a car coupling, the combination with a housing, the front portion of said housing being of a convex form on one side and of a concave form on the other, a knuckle arm and a knuckle pivotally mounted inside of said housing, said convex portion forming a buffer in front of said knuckle arm, the concave portion of said housing being adapted to guide and to engage the corresponding buffer of another coupling.

4. In a car coupling, the combination with a housing, the front portion of said housing being of a convex form on one side and of a concave form on the other, a knuckle arm pivotally mounted inside and back of said housing, a knuckle pivotally mounted on said arm, said convex portion extending in front of said knuckle arm with said knuckle in the form of a buffer with converging sides, the concave portion of said housing being adapted to guide and to engage the buffer of a similar and corresponding coupling.

5. In a car coupling, the combination with a housing, the front portion of said housing being of a convex form on one side and of a concave form on the other side, a knuckle arm pivotally mounted inside and back of said housing, a knuckle pivotally mounted on said arm, said convex portion encircling said knuckle in the front and forming a buffer with converging sides, the sides of said housing being adapted to limit the movements of said knuckle arm, the concave portion of said housing being adapted to guide and to engage the buffer of another coupling.

6. In a car coupling, the combination with a housing, the front portion of said housing being convex on one side and concave on the other of a knuckle arm and a knuckle pivotally mounted inside of said housing, the pivots of said arm and said knuckle being back of said convex portion, the concave portion being adapted to guide and to engage the corresponding convex portion of another coupling without interfering with the movements of said arm and said knuckle.

Signed at New York, in the county of New York and State of New York, this 19th day of January A. D., 1923.

THEODORE P. GARANKIN.